United States Patent [19]

Riley et al.

[11] Patent Number: 5,151,203
[45] Date of Patent: Sep. 29, 1992

[54] COMPOSITION AND METHOD FOR CEMENTING A WELL

[75] Inventors: Wendell D. Riley, Marlow; Jerry D. Childs, Duncan, both of Okla.

[73] Assignee: Halliburton Company, Duncan, Okla.

[21] Appl. No.: 718,679

[22] Filed: Jun. 21, 1991

[51] Int. Cl.$^5$ .................... E21B 33/138; E21B 33/14; C04B 7/353; C04B 24/34

[52] U.S. Cl. .................. 252/8.551; 106/692; 106/695; 106/734; 106/606; 166/281; 166/285; 166/293

[58] Field of Search ............... 106/692, 695, 734, 606; 252/8.551, 8.514; 166/281, 285, 293

[56] References Cited

U.S. PATENT DOCUMENTS

| | | | |
|---|---|---|---|
| 2,880,096 | 3/1959 | Hurley | 166/293 |
| 3,860,070 | 1/1975 | Herce et al. | 166/292 |
| 3,874,885 | 4/1975 | Lyass et al. | 106/97 X |
| 3,882,938 | 5/1975 | Bernard | 166/270 |
| 3,922,172 | 11/1975 | Crinklemeyer et al. | 106/104 |
| 3,928,052 | 12/1975 | Clement, Jr. | 106/76 |
| 3,943,996 | 3/1978 | Guilbaut et al. | 166/293 |
| 4,009,755 | 3/1977 | Sandiford | 166/270 |
| 4,069,869 | 1/1978 | Sandiford | 166/270 |
| 4,124,075 | 11/1978 | Messenger | 166/293 |
| 4,140,183 | 2/1979 | Holm | 166/270 |
| 4,354,875 | 10/1982 | Powers et al. | 106/74 |
| 4,384,894 | 5/1983 | Vickers et al. | 106/80 |
| 4,455,169 | 6/1984 | Chatterji et al. | 106/93 |
| 4,528,792 | 7/1985 | Cross et al. | 52/704 |
| 4,534,412 | 8/1985 | Dovan et al. | 166/295 |
| 4,707,188 | 11/1987 | Tsuda et al. | 166/93 |
| 4,734,134 | 3/1988 | Padtberg et al. | 166/293 X |
| 4,957,555 | 9/1990 | Wheeler et al. | 106/716 |
| 5,006,177 | 4/1991 | Oberste-Padtberg | 106/805 |

OTHER PUBLICATIONS

"Transition Time of Cement Slurries Between the fluid and Set State" SPE 9285, Sep. 1980, Sabins, et al.

"The Relationship of Thickening Time, Gel Strength and Compressive Strengths of Oil Well Cements" SPE 11205, Sep. 1982, Sabins, et al.

Halliburton Services "Gas Migration Control Solutions" Sep. 1990.

"Annular Gas Flow Theory and Prevention Methods Described New Evaluation for Annular Gas-Flow Potential", Oil & Gas Journal, Dec. 10 & 17, 1984, Sutton, et al.

"Interrelationship Between Critical Cement Properties and Volume Changes During Cement Setting" SPE 20451, Sep. 1990, Sutton, et al.

Primary Examiner—Robert L. Stoll
Assistant Examiner—C. Sayala
Attorney, Agent, or Firm—Thomas R. Weaver

[57] ABSTRACT

A composition for and method of performing primary cementing operations is disclosed. The method comprises the use of a water slurry of a thixotropic cementing composition which rapidly develops sufficient static gel strength to reduce if not eliminate annular gas migration.

21 Claims, No Drawings

COMPOSITION AND METHOD FOR CEMENTING A WELL

BACKGROUND OF THE INVENTION

1. Technical Field of the Invention

This invention relates to the construction of wells. The invention further relates to primary cementing operations involved in the construction of wells penetrating subterranean formations. This invention still further relates to hydraulic cementing compositions and methods of using them to perform primary cementing operations.

2. Problems Solved

During the construction of a well, such as an oil and gas well, it is known in the art to place a volume of a water slurry of a hydraulic cement into the annular space defined between the walls of the borehole penetrating a subterranean formation and the exterior surface of the well casing suspended therein. It is also known in the art to place the slurry into the annular space defined between the walls of concentric pipes— such as a well casing and a liner—suspended in the borehole. Subsequent to placement of the slurry further construction operations in the borehole, such as drilling, are suspended for a time sufficient to permit the slurry to set, that is to solidify, to thereby form a mass of hardened cement in the annulus. The mass of hardened cement is referred to as the sheath. The cementing procedure thus described leading to and terminating with the construction of the sheath is referred to as primary cementing. The objectives of the sheath are to provide physical support and positioning of the casing in the borehole; to bond the casing to the walls of the borehole; to prevent the movement of fluid (liquid or gas) between formations penetrated by the borehole; and to prevent fluid from completely escaping the well at the surface of the earth.

In addition to the above objectives, it is desirable that the slurry set and develop sufficient compressive strength in as short a period of time as possible after placement thereof in order to avoid excessive delay in performing further well construction operations. It is a generally accepted standard in the well drilling industry that the compressive strength of set hydraulic cement in the sheath preferably shall be at least about 500 pounds per square inch before further operations may be conducted, wherein the time required to develop the strength, measured from the completion of the placement of the slurry in the annulus, preferably shall not exceed about 24 hours. This time delay is referred to in the art as waiting-on-cement or simply as WOC.

When a slurry of hydraulic cement is positioned in the desired location in the annulus, the slurry movement rapidly changes from a moving, or dynamic, condition when being placed, to a resting, or static, condition after being placed. The slurry, when in the static condition and not yet set, must immediately resist movement of formation fluid through the slurry. Such movement, which is generally gas moving under the influence of formation pressure, is referred to as annular gas migration or simply as gas migration. In addition, the slurry itself, when in the static condition, must resist any movement by it into subterranean zones with which the slurry is in communication. Such movement is generally due to the influence of hydrostatic pressure of the slurry on the zone and is referred to as fall back because the height of slurry in the annulus is reduced by the quantity of slurry penetrating the zone.

Gas migration in the slurry leads directly to gas migration in the sheath, and can cause poor bonding of cement, casing and borehole. Fall back can result in a reduction of the quantity of sheath required to position and support the casing in the borehole. Accordingly, gas migration through the slurry and fall back of the slurry can frustrate the stated objectives of the sheath.

DISCLOSURE OF INVENTION

This invention provides a composition for and a method of cementing a casing in a borehole whereby gas migration and fall back ar substantially reduced if not eliminated.

It has been discovered that addition of an effective amount of sodium aluminate to a slurry of hydraulic cement in water can substantially improve the static gel strength of the slurry and particularly the rate of development thereof whereby gas migration and fall back are substantially reduced if not eliminated.

The expression, static gel strength, as used herein, generally refers to the capacity of a fluid under static conditions to resist being moved by a shear force or simply as shear resistance. Where the fluid under consideration is a slurry of a hydraulic cement in water the expression more specifically refers to the resistance to movement, or internal rigidity, developed by the slurry when the slurry is not in motion.

A slurry having a sufficiently high static gel strength can prevent gas migration and can support its own weight to thereby resist and prevent fall back.

It is believed that a cement slurry having a static gel strength, SGS, of about 500 pounds per 100 square feet can prevent the percolation of gas through the slurry, i.e., prevent gas migration. Also, SGS developed in the cement slurry can prevent fall back due to resistance of the slurry to slide tangentially against the walls of the pipe or bore hole. Accordingly, a slurry used in primary cementing should develop a sufficient static gel strength as quickly as possible. The time to develop 500 SGS, referred to herein as transition time, is preferably in the range of from about 15 minutes to about 45 minutes after the slurry has been positioned as desired in the annulus. A more preferred transition time is in the range of from about 20 minutes to about 40 minutes to develop 500 SGS. A slurry of hydraulic cement in water, either alone or having admixed therewith the usual cementing additives such as defoamers, fluid loss agents and set retarding agents, which develops 500 SGS within a reasonable period of time is said to be a thixotropic cement. Accordingly, by this definition, the cement slurry of this invention is a thixotropic cement.

A slurry of hydraulic cement in water to be useful in primary cementing must have the property of remaining sufficiently fluid for the time required to place the slurry in the desired position in the annulus. This time, referred to as pumping time and also as thickening time, is measured substantially from the time of preparation of the slurry to the time when the slurry has developed sufficient consistency to resist an applied torque. In more practical terms, thickening time informs an operator of the amount of time available to pump the volume of slurry required to be placed into the desired location. A pumping time in the range of from about 3 to about 6 hours is considered by persons skilled in the art as an adequate pumping time for a slurry of hydraulic cement in water.

As used herein, thickening time is specifically defined as the time required for a slurry to develop 70 Bearden units of slurry consistence or more simply 70 Bc. The measurement of thickening time is described in Section 8, "Specification for Materials and Testing for Well Cements," API Specification 10 (SPEC 10), Fifth Edition, Jul. 1, 1990, which is incorporated herein by reference.

Transition time, thickening time, WOC and compressive strength development of a slurry of hydraulic cement in water are all influenced by a number of factors including, the salt content of the mixing water, the quantity of mixing water, the cement itself and the temperature to which the slurry is exposed while hardening.

In general by decreasing slurry density, such as by increasing the quantity of mixing water, strength development is retarded, transition time increases, WOC increases and compressive strength decreases. Similar results are obtained by decreasing setting temperature environment to values of about 180° F. or lower. Addition of salt, such as sodium chloride, to the mixing water produces a variable result, depending upon the amount of salt. That is, low concentrations of salt seem to produce an acceleration effect while higher concentrations seem to produce a retardation effect.

The various effects alluded to above can be offset by adding an effective amount of sodium aluminate to a given slurry. In this regard, with respect to a given slurry, transition time, thickening time, WOC and initial set can be accelerated and compressive strength can be increased by adding thereto an effective amount of sodium aluminate.

DESCRIPTION OF PREFERRED EMBODIMENTS

To thus demonstrate the effect of the sodium aluminate additive, please refer to Example I, below, wherein several slurries of approximately the same density, same quantity and type of cement and same quantity and type of deaerating agent are employed. The slurries essentially differ with respect to the concentrations of sodium chloride and sodium aluminate. Mixing water is varied to maintain density. A low temperature, 91° F., is employed in the determination of transition time and thickening time and a temperature of 110° F. is employed to determine initial set, WOC and 24 hour compressive strength. Both of these temperatures would be expected to produce a retarding effect upon the development of the above properties.

Tables 1A and 1B demonstrate the effect on these properties produced by increasing salt concentration wherein Slurry 1 has no salt and Slurry 5 is salt saturated with respect to mixing water. Tables 2A and 2B demonstrate the effects on the above properties by the addition of various quantities of sodium aluminate to the slurries described in Table 1A. Notice the somewhat erratic results shown in Table 1B where no aluminate is present and compare these with the more uniform results shown in Table 2B produced by the addition of sodium aluminate. Compare Tables 1B and 2B and notice, in particular, the marked acceleration of transition time in both fresh water and salt water, as well as the adjustment of thickening times to the desired values referred to above; both enhancements are produced by the addition of sodium aluminate. In addition, the development of 24 hour compressive strength is rendered more uniform and WOC times are all within acceptable limits. The results achieved are all considered quite acceptable with the exception of those for salt saturated water (37.2% by weight). Accordingly, at salt concentrations in the range of 0 percent to about 18 percent by weight of water improvement of the various properties can be produced.

It is believed that satisfactory results, such as those shown in Table 2B, can be obtained, with respect to a slurry of any given density having a salt concentration in the range of from 0 up to about 18% by weight of water, by adjusting the amount of sodium aluminate relative to the amount of salt to values in the range of from about 0.02 to about 0.35 weight parts aluminate per weight part of salt in the slurry. Where salt is not present in the slurry, it is believed that the concentration of aluminate should be in the range of from about 0.2 to about 2.0, preferably from about 0.4 to about 1.0 and still more preferably from about 0.6 to about 0.8 weight parts sodium aluminate per 100 weight parts of hydraulic cement in the slurry. Where salt is present in the slurry, it is believed that the concentration of aluminate should be in the range of from about 0.4 to about 6.0, preferably from about 0.8 to about 3.0 and still more preferably in the range of from about 1.0 to about 2.0 weight parts sodium aluminate per 100 weight parts of hydraulic cement in the slurry.

EXAMPLE I

Ten slurries comprising hydraulic cement in water were prepared for testing. Each slurry was formulated to produce a density of about 15.6 to about 15.7 pounds per gallon. The specific hydraulic cement employed in each slurry was API Class H, as manufactured by Lonestar Cement Company, and mixing water was that available from the tap in Duncan, Oklahoma. Each slurry included a defoaming agent to eliminate air entrainment. The agent was a commercially available material known as D-AIR 1 which is polypropylene glycol deposited on diatomaceoces earth. Sodium chloride was present in eight of the slurries in concentrations of 6 percent, 12 percent, 18 percent and 37.2 percent salt by weight of water in the slurry. The SGS Agent, a water solution of sodium aluminate, was present in five of the slurries. The sodium aluminate concentration in the solution was about 35 percent by weight and the solution had a specific gravity of about 1.45. The solution also included a small quantity of sodium hydroxide and had a pH of 14.0.

The specific recipe for each slurry is set out in Table 1A and Table 2A, below.

The test conditions and results are reported in Table 1B and Table 2B, below.

TABLE 1a

| | Recipe | | | | |
|---|---|---|---|---|---|
| | Slurry | | | | |
| | 1 Weight Parts | 2 Weight Parts | 3 Weight Parts | 4 Weight Parts | 5 Weight Parts |
| Water[1] | 45.3 | 47.7 | 48.9 | 50.1 | 52.7 |
| Cement | 100 | 100 | 100 | 100 | 100 |
| Defoamer | 0.25 | 0.25 | 0.25 | 0.25 | 0.25 |
| Salt | 0 | 2.86 | 5.87 | 9.01 | 19.6 |
| SGS Agent[2] | 0 | 0 | 0 | 0 | 0 |
| Slurry Density[3] | 15.7 | 15.6 | 15.6 | 15.6 | 15.6 |

TABLE 1a-continued

| | Recipe | | | | |
|---|---|---|---|---|---|
| | Slurry | | | | |
| | 1 Weight Parts | 2 Weight Parts | 3 Weight Parts | 4 Weight Parts | 5 Weight Parts |
| Ratio: SGS Agent / Salt | — | 0 | 0 | 0 | 0 |

[1] Total water including mixing water and water in SGS Agent
[2] Active ingredient only, does not include water
[3] Slurry density, lb/gal

TABLE 1B

| | RESULTS | | | | |
|---|---|---|---|---|---|
| | TIME, HR:MIN | | | | |
| Slurry No. | Initial Set[2] 50 PSI | WOC[2] 500 PSI | Transition[1] 500 SGS | Thickening[1] 70 BC | Comp. Str.[2] 24 HR PSI |
| 1 | 3:08 | 7:23 | 1:40 | 10:20 | 2000 |
| 2 | 3:15 | 14:30 | 1:00 | 4:47 | 680 |
| 3 | 1:28 | 4:45 | 1:13 | 7:45 | 1600 |
| 4 | 2:54 | 45:38 | 1:08 | 21:31 | 250 |
| 5 | 8:08 | 25:50 | 2:07 | 25:30+ | 410 |

[1] Thickening time and transition time determined at 91° F. and 1500 psi
[2] Initial Set, WOC and 24 hour compressive strength determined at 110° F. and 3000 psi in ultrasonic cement analyzer (U.S. Pat. No. 4,259,868)

TABLE 2a

| | Recipe | | | | |
|---|---|---|---|---|---|
| | Slurry | | | | |
| | 1 Weight Parts | 2 Weight Parts | 3 Weight Parts | 4 Weight Parts | 5 Weight Parts |
| Water[1] | 45.8 | 48.3 | 49.6 | 51.0 | 55.5 |
| Cement | 100 | 100 | 100 | 100 | 100 |
| Defoamer | 0.25 | 0.25 | 0.25 | 0.25 | 0.25 |
| Salt | 0 | 2.9 | 5.94 | 9.19 | 20.65 |
| SGS Agent[2] | 0.54 | 0.67 | 0.68 | 0.9 | 2.70 |
| Slurry Density[3] | 15.7 | 15.6 | 15.6 | 15.6 | 15.6 |
| Ratio: SGS Agent / Salt | 0 | 0.232 | 0.114 | 0.098 | 0.131 |

[1] Total water including mixing water and water in SGS Agent
[2] Active ingredient only, does not include water
[3] Slurry density, lb/gal

TABLE 2B

| | Results | | | | |
|---|---|---|---|---|---|
| | Time, Hr:Min | | | | |
| Slurry No. | Initial Set[2] 50 psi | WOC[2] 500 psi | Transition[1] 500 SGS | Thickening[1] 70 Bc | Comp. Str.[2] 24 HR psi |
| 1 | 2:09 | 4:55 | 0:43 | 5:05 | 2300 |
| 2 | 2:08 | 5:55 | 0:59 | 2:56 | 1750 |
| 3 | 2:13 | 5:35 | 0:29 | 3:34 | 1750 |
| 4 | 2:40 | 7:24 | 0:54 | 5:16 | 1250 |
| 5 | 9:46 | >25:50 | 1:05 | 14:17+ | 310 |

[1] Thickening Time and Transition Time determined at 91° F. and 1500 psi
[2] Initial Set, WOC and 24 Hour Compressive Strength determined at 110° F. and 3000 psi in Ultrasonic Cement Analyzer (U.S. Pat. No. 4,259,868)

As mentioned above sodium aluminate is the specific additive employed herein to improve the thixotropic property of a slurry of hydraulic cement in water as well as to improve the various other properties previously mentioned. However, it is believed that any of the well known alkali metal aluminates can be utilized in the amounts mentioned above to achieve comparable results.

The aluminate additive useful herein can be used in the undiluted (dry) condition. In fact, the concentration ranges and ratio ranges recited above are based on aluminate in undiluted solid form. However, for matters of convenience of use, it is advantageous to add the aluminate as a water solution. One such useful solution contains about 35 percent by weight sodium aluminate and 65 percent by weight water and sufficient sodium hydroxide to adjust the pH to a value of about 14.

In a broader sense, water solutions of aluminate useful herein can contain in the range of from about 30 percent to about 40 percent aluminate by weight of solution. Based upon the concentration ranges set out previously such water solutions can be present in a slurry of hydraulic cement in water in the range of from about 0.67 percent to about 15 percent solution by weight of cement. The aluminate solution is preferably present in the range of from about 1 percent to about 6 percent and still more preferably in the range of about 2 percent to about 3 percent aluminate solution by weight of cement.

It is not the desire herein to be bound by a particular theory of operation or of attained result; however, it is believed that the majority of the thixotropic response observed herein is a result of bridging between initially hydrated cement particles wherein the bridging agent is believed to be the ionic aluminate chains which occur in the totally ionic, high pH, aluminate solution described herein. Accordingly, the currently preferred method of introducing the aluminate into the slurry is by means of a high pH, water solution thereof such as that described herein.

The term "hydraulic cement" as used herein means all inorganic cementitious materials of known type which comprise compounds of calcium, aluminum, silicon, oxygen and/or sulfur which exhibit "hydraulic activity". "Hydraulic activity" as used herein means the chemical nature of material to set and harden, upon being mixed with water, without contact with the atmosphere e.g. the ability to harden under water) due to the interaction of the constituents of the material rather than by evaporation of the water.

Cements of this type include common Portland cements, fast setting or extra fast setting, sulfate resistant cements, modified cement, alumina cements, high alumina cement, calcium aluminate cements, and cements which contain secondary components such as fly ash, pozzalona and the like.

Portland cements are classified by the American Society of Testing Materials (ASTM) into five major types identified by Roman Numerals I, II, III, IV and V and by the American Petroleum Institute into at least 9 categories identified by the letters A, B, C, D, E, F, G, H and J. The classifications are based on chemical compositions and physical properties.

In this regard, refer to Section 2 of the above cited API Spec. 10 for a further discussion of API cements. Section 2 is incorporated herein by reference.

The quantity of water utilized to mix with the hydraulic cement must be in an amount sufficient to fully satisfy the potential hydraulic activity of the cement. Such values are specified in Section 5 of the above cited API Spec. 10 which is incorporated herein by reference. In general, however, the quantity of water to be used is in the range of from about 35 to about 60 weight parts water per 100 weight parts of cement.

Cement slurries particularly useful herein which include the aluminate additive of this invention, can have a wide range of densities. Particularly preferred slurries have densities in the range of from about 11.5 to about 22.0 and preferably about 15 to 16 lb. slurry per gallon slurry.

Cement slurries containing the aluminate additive of this invention exhibit thixotropic properties, as above defined, and aid in obtaining early compressive strength at setting temperatures in the range of from about 40° F to about 180° F.

Salt is often used in cement during oil field primary cementing operations. The use of salt in the cement slurry provides several advantages. First, salt containing cement slurries bond more firmly to salt and shale sections often found in subterranean formations. Second, when salt is present in the cement slurry in sufficiently large quantities, it assists in the prevention of shale sections from sluffing, bridging between formation zones, and washing out, and salt formations from leeching or washing out.

As used herein, the term salt particularly refers to sodium chloride and to solutions which include sodium chloride as a primary ingredient, such as sea salt. The term also particularly includes potassium chloride and the alkali metal halides in general.

EXAMPLE II

Slurries of hydraulic cement in water were prepared and tested to determine transition time and thickening time. The slurries varied in density and included both fresh water, salt water and sea water. Certain of the slurries included Halad fluid loss additive and HR-5 retardant.

The slurry recipes are contained in Table 3A below and the Test results are contained in Table 3B below.

Halad is a registered trademark of Halliburton Company. It is used to designate a series of products referred to as fluid loss additives. Additives of this type prevent the loss of the aqueous phase of the cementing slurry to subterranean formations. In the absence of fluid loss additives, it is possible that the slurry density could increase to the point where circulation pressures become unacceptably high, slurry response properties are adversely effected, and/or formation of a bridge in the annulus results in a premature job termination. Additives of this type are typically cellulose derivatives, mixtures of cellulose derivatives and other components, or synthetic polymers. Additives based on cellulose derivatives are described in U.S. Pat. No. 4,455,169, while additives based on synthetic polymers are described in U.S. Pat. No. 4,555,269.

HR-5 is a registered trademark of Halliburton Company. It is a refined sodium lignosulfonate employed as a cement hydration retardant. Products of this type are described in U.S. Pat. No. 4,047,567.

U.S. Pat. Nos. 4,047,567, 4,455,169 and 4,555,269 are incorporated herein by reference.

TABLE 3A

| | | Recipe 0.25% Defoamer[4] | | | | | |
|---|---|---|---|---|---|---|---|
| Slurry No. | Cement Type | SGS Agent[3] (gal/sk) | KCl (%)[5] | NaCl (%)[5] | Sea Water (gal/sk) | Fresh Water (gal/sk) | Density (lb/gal) |
| 1 | LeHarve[1] | 0.05 | 0.0 | 0.0 | 5.36 | 0.00 | 15.6 |
| 2 | LeHarve | 0.10 | 0.0 | 0.0 | 5.33 | 0.00 | 15.6 |
| 3 | LeHarve | 0.15 | 0.0 | 0.0 | 5.31 | 0.00 | 15.6 |
| 4 | LeHarve | 0.10 | 0.0 | 0.0 | 6.17 | 0.00 | 15.0 |
| 5 | LeHarve | 0.08 | 0.0 | 0.0 | 7.98 | 0.00 | 14.0 |
| 6 | LeHarve | 0.35 | 0.0 | 0.0 | 10.54 | 0.00 | 13.0 |
| 7 | LeHarve | 0.30 | 0.0 | 0.0 | 12.37 | 0.00 | 12.5 |
| 8 | LeHarve | 0.15 | 0.0 | 0.0 | 12.39 | 0.00 | 12.5 |
| 9 | LeHarve | 0.15 | 0.0 | 0.0 | 12.39 | 0.00 | 12.5 |
| 10 | LeHarve | 0.20 | 0.0 | 0.0 | 12.38 | 0.00 | 12.5 |
| 11 | LeHarve | 0.15 | 3.0 | 0.0 | 0.00 | 5.21 | 15.6 |
| 12 | LeHarve | 0.25 | 3.0 | 0.0 | 0.00 | 7.76 | 14.0 |
| 13 | LSH[2] | 0.50 | 0.0 | 6 | 0.00 | 12.57 | 12.5 |
| 14 | LSH | 0.75 | 0.0 | 6 | 0.00 | 12.56 | 12.5 |
| 15 | LSH | 1.00 | 0.0 | 6 | 0.00 | 12.55 | 12.5 |
| 16 | LSH | 0.15 | 0.0 | 12 | 0.00 | 5.45 | 15.6 |
| 17 | LSH | 0.50 | 0.0 | 12 | 0.00 | 13.43 | 12.5 |
| 18 | LSH | 1.00 | 0.0 | 12 | 0.00 | 13.45 | 12.5 |
| 19 | LSH | 1.15 | 0.0 | 12 | 0.00 | 13.45 | 12.5 |
| 20 | LSH | 1.25 | 0.0 | 12 | 0.00 | 13.45 | 12.5 |
| 21 | LSH | 1.50 | 0.0 | 12 | 0.00 | 12.95 | 12.6 |
| 22 | LSH | 2.00 | 0.0 | 12 | 0.00 | 11.50 | 12.5 |
| 23 | LSH | 0.20 | 0.0 | 18 | 0.00 | 5.57 | 15.6 |
| 24 | LSH | 0.30 | 0.0 | 37.2 | 0.00 | 5.82 | 15.6 |
| 25 | LSH | 0.40 | 0.0 | 37.2 | 0.00 | 5.78 | 15.6 |
| 26 | LSH | 0.50 | 0.0 | 37.2 | 0.00 | 5.74 | 15.6 |
| 27 | LSH | 0.60 | 0.0 | 37.2 | 0.00 | 5.70 | 15.6 |
| 28 | LSH | 1.00 | 0.0 | 37.2 | 0.00 | 5.53 | 15.6 |

[1] LeHarve is API Class H Cement as manufactured by LaFarge Corp., LaFarge, France
[2] LSH is API Class H Cement as manufactured by Lonestar Industries, Inc., Greenwich, Conn.
[3] The SGS Agent is sodium aluminate in a 35% by weight water solution having a specific gravity of 1.45 and a pH of 14.0. The concentration of agent is expressed in gallons per 94-lb. sack of cement
[4] The defoamer is a commercially available material known as D-AIR 1
[5] Percent by weight of water

TABLE 3B

| | | Results | |
|---|---|---|---|
| Slurry No. | Cement Type | Transition Time (Min) | Thickening Time (Hr:Min) |
| 1 | LeHarve | 30 | 3:23 |
| 2 | LeHarve | 10 | — |
| 3 | LeHarve | 22 | — |
| 4 | LeHarve | 20 | — |
| 5 | LeHarve | 27 | 4:35 |
| 6 | LeHarve | 12 | — |
| 7 | LeHarve | 8 | — |
| 8 | LeHarve | 32 | — |
| 9 | LeHarve | 23 | 6:30 |

TABLE 3B-continued

| Slurry No. | Cement Type | Results | |
|---|---|---|---|
| | | Transition Time (Min) | Thickening Time (Hr:Min) |
| 10 | LeHarve | 30 | 3:23 |
| 11 | LeHarve | 26 | 2:54 |
| 12 | LeHarve | 18 | 12:15 |
| 13 | LSH | — | 22:50+ |
| 14 | LSH | — | 22:00+ |
| 15 | LSH | — | 7:00+ |
| 16 | LSH | 29 | 3:34 |
| 17 | LSH | — | 22:39 |
| 18 | LSH | — | 23:30 |
| 19 | LSH | — | 8:06 |
| 20 | LSH | — | 0:42 |
| 21 | LSH | — | 0:34 |
| 22 | LSH | — | 0:31 |
| 23 | LSH | 26 | 3:30 |
| 24 | LSH | — | 17:18+ |
| 25 | LSH | — | 16:48+ |
| 26 | LSH | — | 15:25+ |
| 27 | LSH | — | 14:17+ |
| 28 | LSH | — | 32:00+ |

What is claimed is:

1. A thixotropic cementing composition consisting essentially of hydraulic cement, water, an alkali metal aluminate and an alkali metal halide:
   wherein, said aluminate is present in said composition in an amount in the range of from about 0.2 to about 6.0 percent aluminate by weight of said hydraulic cement; said water is present in said composition in amount in the range of from about 35 to about 60 percent water by weight of said hydraulic cement; and said alkali metal halide is present in said composition in an amount in the range of from about a trace up to about 18 percent of said halide by weight water.

2. The composition of claim 1 wherein said alkali metal aluminate is sodium aluminate.

3. The composition of claim 2 wherein said alkali metal halide is sodium chloride.

4. The composition of claim 3 wherein said aluminate is present in a water solution thereof in the amount in the range of from about 30 percent to about 40 percent aluminate by weight of said solution and said solution is present in said composition in an amount in the range of from about 0.67 percent to about 15 percent solution by weight of said hydraulic cement.

5. The composition of claim 4 wherein said hydraulic cement is Portland cement.

6. A method of increasing the thixotropic nature of a slurry consisting essentially of hydraulic cement in water wherein said water includes an alkali metal halide present therein in an amount in the range of from about 0 up to about 18 percent halide by weight of said water, said method consisting essentially of adding to said slurry an effective amount of an alkali metal aluminate.

7. The method of claim 6 wherein said water is present in said slurry in an amount in the range of from about 35 percent to about 60 percent water by weight of said hydraulic cement.

8. The method of claim 7 wherein said aluminate is added to said slurry in an amount in the range of from about 0.2 percent to about 6.0 percent aluminate by weight of said hydraulic cement.

9. A method of reducing the time required for a slurry consisting essentially of Portland cement in water to set into a hardened mass wherein said water contains an alkali metal halide dissolved therein in an amount in the range of from about 0 up to about 18 percent halide by weight of said water,
   said method consisting essentially of adding to said slurry an effective amount of an alkali metal aluminate.

10. The method of claim 9 wherein said slurry is caused to set at a temperature of up to about 180° F.

11. The method of claim 10 wherein said water is present in said slurry in an amount in the range of from about 35 percent to about 60 percent water by weight of said hydraulic cement.

12. The method of claim 11 wherein said aluminate is added to said slurry in an amount in the range of from about 0.2 percent to about 6.0 percent aluminate by weight of said hydraulic cement.

13. The method of claim 12 wherein said aluminate is added to said slurry in a water solution thereof wherein said aluminate is present in said solution in an amount in the range of from about 30 percent to about 40 percent aluminate by weight of said solution.

14. The method of claim 13 wherein said water solution of said aluminate is added to said slurry in an amount in the range of from about 0.67 percent to about 15 percent solution by weight of said hydraulic cement.

15. A method of reducing gas migration through and fall back of a static slurry consisting essentially of Portland cement in water by accelerating the development of static gel strength of said slurry
   wherein said method consists essentially of adding to said slurry an effective amount of an alkali metal aluminate and further
   wherein an alkali metal halide is present in said slurry in an amount up to about 18 pounds halide per 100 pounds of water in said slurry.

16. The method of claim 9 wherein said alkali metal aluminate is sodium aluminate and said alkali metal halide is sodium chloride.

17. The method of claim 15 wherein said effective amount of said alkali metal aluminate is in the range of from about 0.2 to about 6.0 percent of said aluminate by weight of said hydraulic cement.

18. The method of claim 17 wherein said water is present in said slurry in the range of from about 35 percent to about 60 percent water by weight of said hydraulic cement.

19. The method of claim 18 wherein said alkali metal aluminate is sodium aluminate and said alkali metal halide is sodium chloride.

20. The method of claim 19 wherein said slurry is maintained in said static condition at a temperature in the range of from about 40° F. to about 180° F.

21. The method of claim 20 wherein said sodium aluminate is added to said slurry in the form of a water solution thereof, wherein said aluminate is present in said solution in the range of from about 30 percent to about 40 percent by weight of said solution, said solution has a pH of about 14 and said solution has a specific gravity of about 1.45.

* * * * *